United States Patent
Mills et al.

[11] Patent Number: 5,964,465
[45] Date of Patent: *Oct. 12, 1999

[54] LOW CREEP POLYTETRAFLUOROETHYLENE FORM-IN-PLACE GASKETING ELEMENTS

[75] Inventors: David Mills, Newark, Del.; Roy Nelson, Leven Fife, United Kingdom; Wulf Nibler, Deisenhofen; Heinrich Gutsmiedl, Flintsbach, both of Germany

[73] Assignee: W. L. Gore & Associates, Inc., Newark, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/614,702

[22] Filed: Mar. 13, 1996

[51] Int. Cl.$^6$ ....................................................... F16J 15/10
[52] U.S. Cl. .......................... 277/316; 277/627; 277/654
[58] Field of Search ........................................ 428/108, 198, 428/283, 286, 422, 910; 277/314, 316, 608, 611, 627, 650, 654

[56] References Cited

U.S. PATENT DOCUMENTS

| | | | |
|---|---|---|---|
| 2,459,721 | 1/1949 | Poltorak | 277/DIG. 6 |
| 3,953,566 | 4/1976 | Gore | 264/288 |
| 4,096,227 | 6/1978 | Gore | 264/210 R |
| 4,187,390 | 2/1980 | Gore | 174/102 R |
| 4,385,093 | 5/1983 | Hubis | 428/422 |
| 4,580,790 | 4/1986 | Doose | 277/DIG. 6 |
| 4,898,638 | 2/1990 | Lugez | 277/DIG. 6 |
| 4,900,629 | 2/1990 | Pitolaj | 428/422 |
| 4,985,296 | 1/1991 | Mortimer, Jr. | 428/220 |
| 4,990,544 | 2/1991 | Asaumi et al. | 428/422 |
| 4,996,097 | 2/1991 | Fischer | 428/422 |
| 5,128,209 | 7/1992 | Sakai et al. | 428/422 |
| 5,160,773 | 11/1992 | Sassa | 428/422 |
| 5,286,568 | 2/1994 | Bacino et al. | 428/422 |
| 5,418,023 | 5/1995 | Hernandez et al. | 428/422 |
| 5,418,054 | 5/1995 | Sun | 428/422 |
| 5,466,531 | 11/1995 | Tippett et al. | 428/422 |
| 5,486,010 | 1/1996 | Hamilton et al. | 277/1 |
| 5,494,301 | 2/1996 | Hamilton et al. | 277/DIG. 6 |
| 5,494,336 | 2/1996 | Barna et al. | 277/1 |
| 5,524,908 | 6/1996 | Reis | 277/233 |
| 5,527,569 | 6/1996 | Hobson et al. | 428/422 |
| 5,560,986 | 10/1996 | Mortimer, Jr. | 428/422 |

OTHER PUBLICATIONS

Brochure: "GORE–TEX GR(R) Sheet Gasketing," W. L. Gore & Associates, Inc., 1993 (C).

*Primary Examiner*—Anthony Knight
*Assistant Examiner*—John L. Beres
*Attorney, Agent, or Firm*—Carol A. Lewis White

[57] ABSTRACT

The present invention is an improved gasket for use in a wide variety of sealing applications. The gasket comprises a continuous, form-in-place gasket element, comprising layers of expanded polytetrafluoroethylene, that has significant tensile strength in both the longitudinal and the transverse directions. As such, the gasketing element of the present invention provides all of the operational advantages of PTFE, while being dimensionally stable, resistant to creep relaxation and providing form-in-place dimensions, thus satisfying a wider range of sealing applications than conventional sealing materials.

7 Claims, 6 Drawing Sheets

LOW CREEP POLYTETRAFLUOROETHYLENE FORM-IN-PLACE GASKETING ELEMENTS

BACKGROUND OF THE INVENTION

1. Field of the Invention

The present invention relates to form-in-place fluoropolymer gasketing elements which exhibit excellent creep relaxation and dimensional stability when subjected to compressive loading.

2. Description of Related Art

Polytetrafluoroethylene (PTFE) has demonstrated utility in many areas. As an industrial material, such as a gasketing material, for example, PTFE has exhibited excellent utility in harsh chemical environments, which normally degrade many conventional metals and polymeric materials. PTFE is also usable over a broad temperature range, from as high as 260° C. to as low as near −273° C.

However, conventional non-porous PTFE materials, which are typically compression molded or extruded, exhibit poor mechanical properties, such as low tensile strength and low resistance to creep relaxation. Creep relaxation, particularly that experienced under compression, is a particular problem for conventional PTFE sealants, which materials have a tendency to spread out under compressive load, thereby reducing their effective sealability over time. Accordingly, despite a number of highly desirable properties, use of PTFE is generally limited to situations not requiring high tensile strength or good resistance to compressive creep relaxation.

Polytetrafluoroethylene may be produced in a porous, expanded form as taught in U.S. Pat. No. 3,953,566 to Gore. This processing creates orientation of the material, and correspondingly strength, primarily in just the longitudinal direction; however biaxial expansion and expansion in the longitudinal direction is also possible. This material is characterized by a plurality of nodes interconnected by fibrils which are oriented based on the direction(s) of expansion. This material may be formed in the shape of films, tubes, rods and continuous filaments. Thus, porous expanded polytetrafluoroethylene (ePTFE) is of a higher strength than unexpanded forms of PTFE, has the chemical inertness of conventional PTFE, and when used as a gasket, has an even wider temperature range of up to as high as 315° C.

Examples of porous, expanded polytetrafluoroethylene gasket materials include GORE-TEX® Joint Sealant and GORE-TEX® Gasket Tape(manufactured by W. L. Gore & Associates, Inc., Elkton Md.), which are available as continuous (i.e., greater than 15 m in length), "form-in-place" sealants. These continuous, form-in-place, conformable ePTFE gaskets generally have their strength oriented in the longitudinal direction of the material due to the expansion of the PTFE in only the longitudinal direction. Thus, the resistance to creep relaxation is primarily in just the longitudinal direction. Such porous ePTFE joint sealants and gasket tapes provide excellent seals in applications having relatively wide sealing surfaces and where sufficient clamping loads can be applied to them so that, as the sealant compresses between the sealing surfaces to form a thin, wide gasket, the level of compressive stress is sufficient to densify the gasket and to provide the desired sealability. Consequently, these gaskets are typically not well suited to applications having narrow sealing surfaces or requiring relatively thick gaskets.

For optimum sealing performance in a gasket, resistance to creep relaxation is desired in both the longitudinal and transverse directions of the material. Materials which exhibit resistance to creep relaxation in multiple directions are commercially available in sheets of bi-axially expanded PTFE, limited to discrete lengths and widths, from which gaskets may be cut to fit a desired geometry (and which is commercially available as GORE-TEX GR® sheet gasketing.

W. L. Gore & Associates, Inc., has produced a number of continuous, form-in-place ePTFE sealants with significant longitudinal and transverse strength. The first consists of a porous polytetrafluoroethylene core, expanded in the longitudinal direction and helically wrapped with a longitudinally expanded sheet, thus imparting transverse strength to the composite by means of the helical wrap, creating a sealing cord of significant longitudinal and transverse strength. This material is commercially available as GORE-TEX® gasket material for use as a static seal between multiple plates of plate-and-frame heat exchangers and plate-and-frame filters. A second, continuous, form-in-place, expanded polytetrafluoroethylene seal with significant multidirectional strength is commercially available as GORE-TEX® Valve Stem Packing (manufactured by W. L. Gore & Associates, Inc., Elkton Md.). This material consists of a core of twisted, bi-axially expanded polytetrafluoroethylene membrane which is helically wrapped with a longitudinally expanded PTFE sheet.

All the above-mentioned variations for imparting strength in the longitudinal and transverse direction, and therefore resistance to creep relaxation in multiple directions, produce continuous, form-in-place sealing elements in the form of helically wrapped cords, tubes or similar geometries which may be formed by a helical-wrap formation technique. Although these materials work quite well, it is believed that even further improvements may be possible, for example, for ease in processing and to achieve other properties desired for gasketing elements.

Accordingly, it is a primary purpose of the present invention to provide a continuous, dimensionally stable, form-in-place gasketing element that is resistant to creep relaxation in both the longitudinal and transverse directions and which does not require the complicated manufacturing set-ups associated with helical-wrap formation techniques.

SUMMARY OF THE INVENTION

The present invention is a formable (form-in-place) fluoropolymer gasketing element exhibiting excellent dimensional stability and resistance to compressive creep relaxation in both the longitudinal and transverse directions.

The gasketing element of the present invention may be formed in virtually any quadrilateral cross-sectional dimension of importance to sealing applications and may be filled with particulate fillers or coated with polymeric materials prior to production of the PTFE gasketing element. Additionally, other components (e.g., sheet elements, etc.) may be readily incorporated with the PTFE sheet(s) used to form the gasket materials of the present invention.

The gasketing element of the present invention forms an effective seal and has increased resistance to distortion under compression over traditional form-in-place PTFE gasketing materials. As a result, the gasketing element of the present invention can be used in many applications where it is difficult or undesirable to apply a conventional gasket, particularly in joints that are difficult to access for periodic maintenance, or as a seal in a joint where specific spacing must be maintained to insure proper operation of the apparatus.

DESCRIPTION OF THE DRAWINGS

The foregoing summary, as well as the following detailed description of a preferred embodiment of the invention, will be better understood when read in conjunction with the appended drawings. For purposes of illustrating the invention, there is shown in the drawings an embodiment which is presently preferred. It should be understood, however, that the invention is not limited to the precise arrangement and instrumentality shown. In the drawings.

DETAILED DESCRIPTION OF THE INVENTION

The present invention is an improved gasketing element constructed from polytetrafluoroethylene (PTFE) having a substantially quadrilateral cross-section and a significantly improved resistance to creep relaxation and dimensional distortion than other continuous, form-in-place PTFE gasketing materials.

Figure 1:
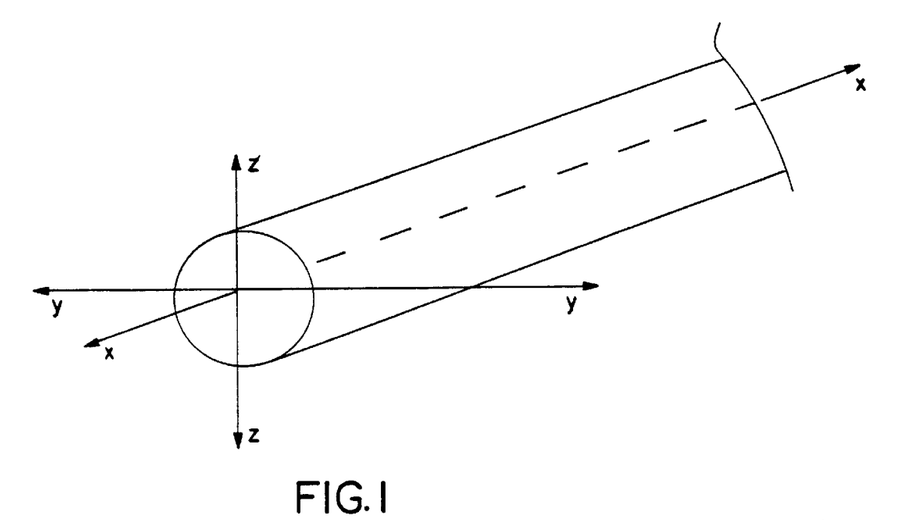
FIG. 1 is a three-quarter perspective view of a conventional gasketing cord.
Figure 2:
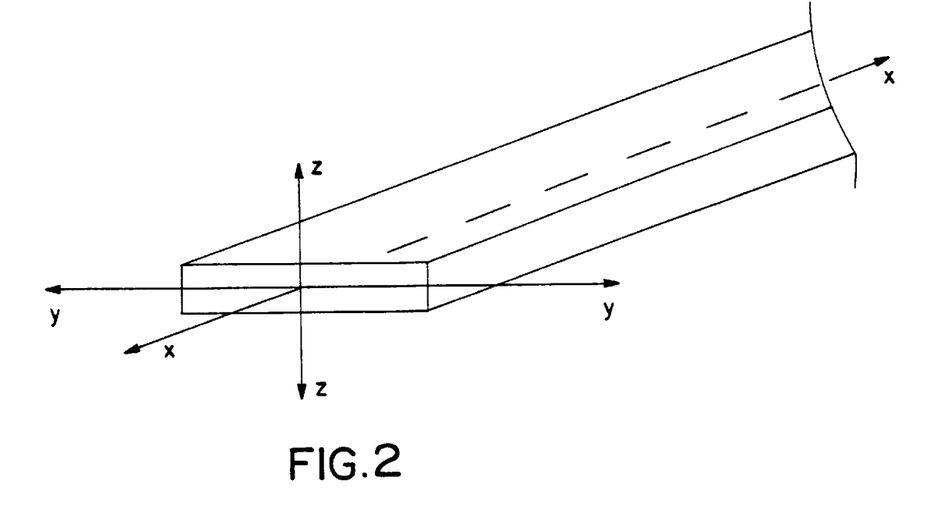
FIG. 2 is a three-quarter perspective view of a conventional gasketing tape.
Figure 3:
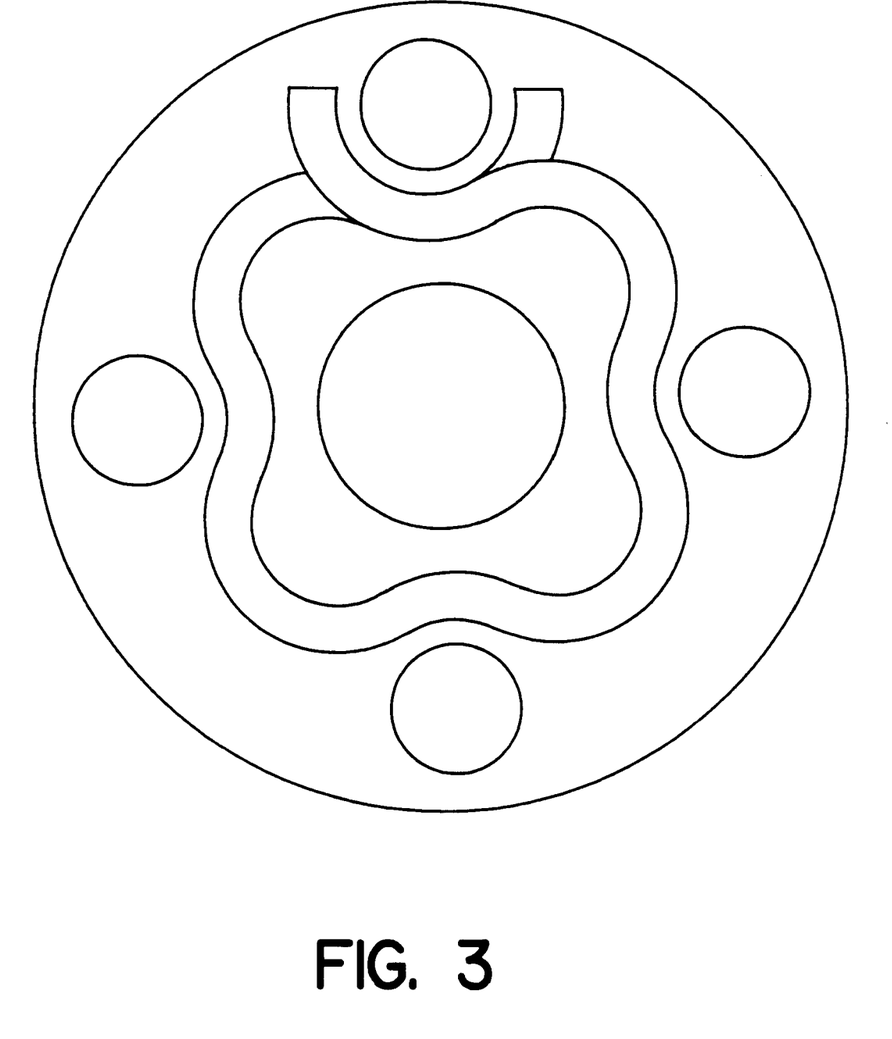
FIG. 3 is a plan view of one installation configuration of a gasket.

Shown in FIGS. 1 and 2 are conventional gasketing elements constructed from longitudinally expanded polytetrafluoroethylene (ePTFE) material. As has been explained earlier herein, due to the tendency of this material to creep when formed as a gasket, as shown in FIG. 3, and placed under a compressive pressure in the "z" direction, the material tends to spread in the "y" direction (and to a lesser degree in the longitudinal "x" direction) upon initial compression and over time, often compromising the seal provided by this material.

Figure 4:
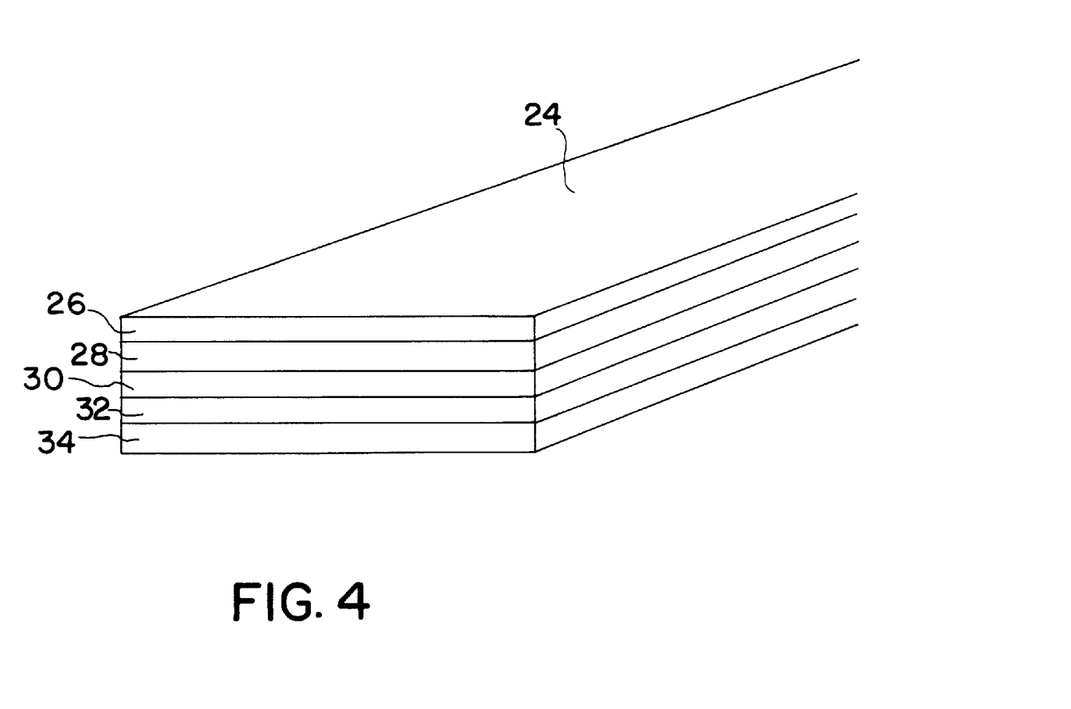
FIG. 4 is a three-quarter perspective view of one embodiment of the present invention.

Shown in FIG. 4 is one embodiment of a gasketing element 24 of the present invention. While the present invention is not limited to the number of layers shown in this figure, this exemplary gasketing element 24 of the present invention comprises multiple layers 26, 28, 30, 32, and 34. Layers 26, 28, 30, 32, and 34 are self-adhered to each layer of which they are in contact, having exposed outside surfaces 26 and 34.

The gasketing element 24 of the present invention can be produced by wrapping sheets (including strips, films or composite materials) of PTFE, microporous PTFE, or preferably an expanded, microporous PTFE (ePTFE) as taught in U.S. Pat. Nos. 3,953,566 and 4,187,390 to Gore, incorporated herein by reference. The thickness of each sheet or layer of expanded PTFE film may be approximately 0.0005 to 0.50 inch (0.013 to 12.7 mm), and preferably approximately 0.001 to 0.02 inch (0.025 to 0.51 mm). The gasketing element may be formed in virtually any quadrilateral cross-sectional dimension of importance to sealing applications and may optionally be filled with particulate fillers or coated with polymeric materials prior to production of the PTFE gasketing element.

Figure 5:
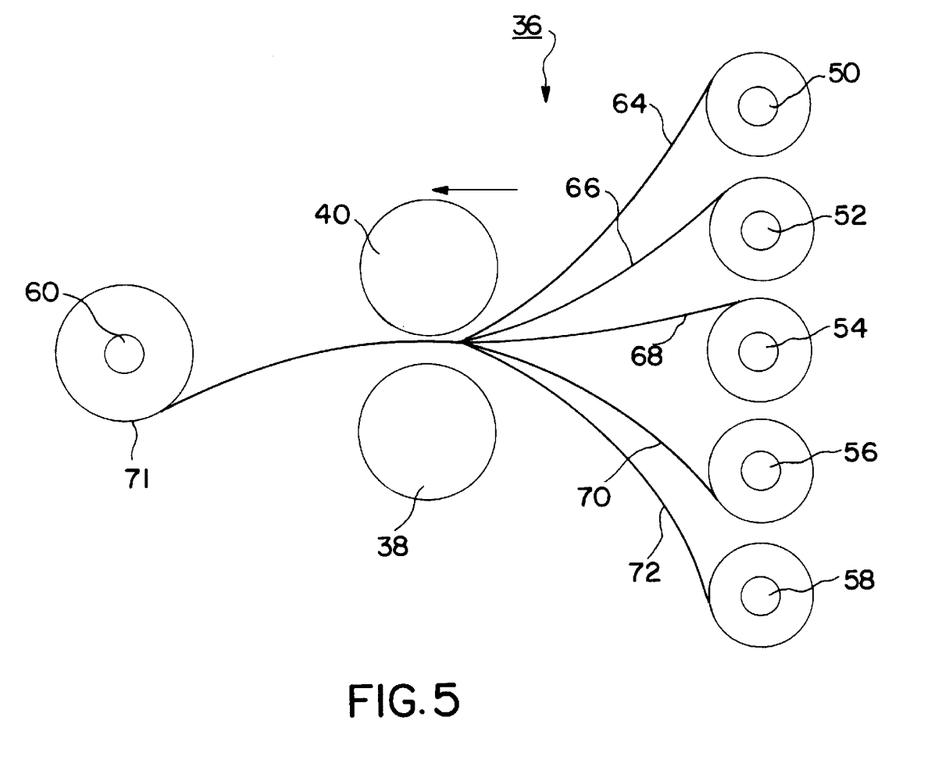
FIG. 5 is a elevational view of one embodiment of the apparatus used to produce the gasket material of the present invention.

FIG. 5 shows one embodiment of an apparatus 36 for forming the PTFE gasket elements of the present invention. The apparatus comprises two metal drums 38 and 40, having the capability for heat, a payoff 48 consisting of multiple payoff arms 50, 52, 54, 56, and 58 (not limited to this quantity), and a take-up 60.

In order to form a PTFE element 24 of the instant invention, coiled lengths of PTFE 64, 66, 68, 70, and 72 (again, not limited to this quantity) are fed between drums 38 and 40 from pay-offs 50, 52, 54, 56, and 58. The outside surfaces of PTFE lengths 64 and 72 come into direct contact with drums 38 and 40 during formation of the gasket material. Drums 38 and 40 are typically of a surface that will not promote sticking and preferably are heated to maintain a temperature of between 300 and 450° C. The pressure, temperature, and speed applied by drums 38 and 40 should be such that the layers of PTFE 64, 66, 68, 70, and 72 being fed between them self adhere to one another, respectively, as they pass between the drums, thereby forming a PTFE element 74 containing multiple layers of PTFE concentrically rolled and adhered to themselves. The tension supplied by the pay-off arms 50, 52, 54, 56, 58 and the take-up 60 should be controlled in such a way that the material before and after the drums remains substantially taut and does not droop.

Figure 6:
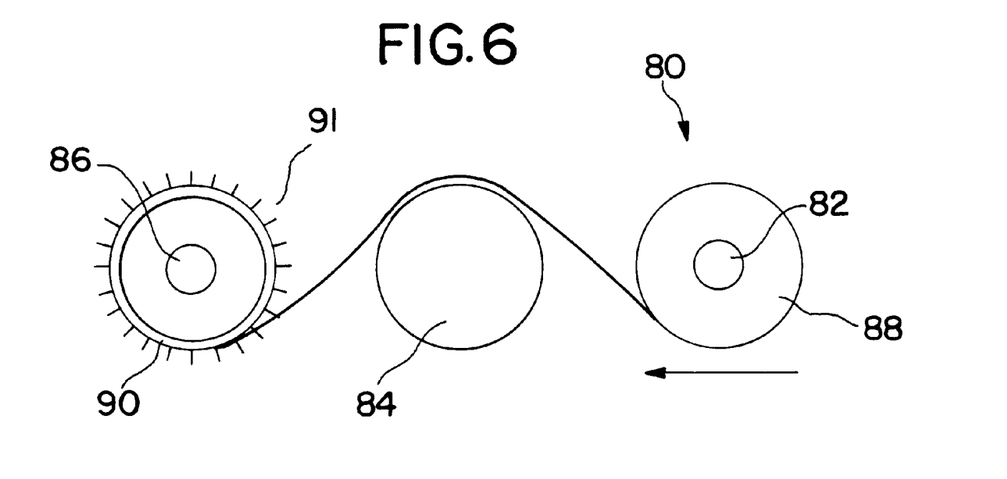
FIG. 6 is a elevational view of another embodiment of the apparatus used to produce the gasket material of the present invention.
Figure 7:
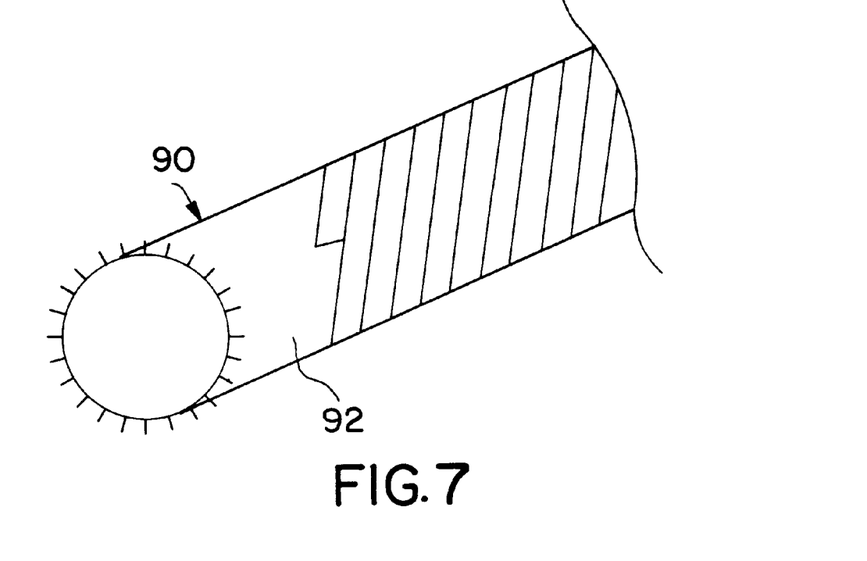
FIG. 7 is an additional three-quarter perspective view of an embodiment of the apparatus displayed in FIG. 6 illustrating a method of manufacture.

FIGS. 6 and 7 show another embodiment of an apparatus 80 for forming the PTFE gasketing element 24 of the present invention. This apparatus comprises a pay-off 82, idler drum 84, which, among other things, acts as a positioning control, take-up 86, and a mandrel 90 with pins 91 for restraining the material.

In order to form the PTFE element of the present invention, a coiled length of PTFE 88 is fed from the pay-off 82, over the idler drum 84, and onto the mandrel 90. The PTFE 88 is layered upon itself as the mandrel is rotated by the take-up 86. When the required number of mandrel rotations or PTFE layers 92 have been delivered, the PTFE 88 is cut or severed and the mandrel is removed from the take-up 86. The mandrel 90 containing the PTFE layers 92 is heated at a temperature and through an adequate time duration such that the layers of PTFE 92 will self-adhere to each other, as described in more detail below. After the heating, the mandrel and PTFE are cooled and the required length and width tape is cut from the layered PTFE 92 in a spiral fashion, as illustrated in FIG. 7.

The degree to which the PTFE layers adhere to themselves is highly dependent upon the temperature the PTFE is exposed to, whether prior to, during or after formation of the gasketing element. For example, one method for achieving adherence between the layers is during contact with drums 38 and 40. If the PTFE sheets are expanded porous PTFE, the sheets may be heated to a temperature in excess of 327° C., or more preferably in excess of 342° C., so that the ePTFE sheet is subjected to a heat treatment amorphous locking process as taught in U.S. Pat. No. 3,953,566 to Gore. The heat treatment amorphous locking process entails exposing the sheets of expanded microporous PTFE to temperatures in excess of 327° C., thereby reducing the crystalline content of the sheet of expanded microporous PTFE.

Alternatively, the sheets of expanded microporous PTFE may be subjected to an amorphous locking process, as mentioned earlier herein, prior to forming into the gasket material of the present invention. By subjecting the sheets of expanded microporous PTFE to the amorphous locking prior to layering the sheets upon a mandrel, fraying of the ePTFE sheets may be reduced when producing the ePTFE gasketing elements.

Still alternatively, the PTFE gasket element may be subjected to a heat treatment amorphous locking process after formation. The heat treatment amorphous locking process may be accomplished by placing the PTFE, element under restraint in a high temperature enclosure. The high temperature enclosure is typically capable of maintaining temperatures in excess of 327° C. The high temperature enclosure may comprise any suitable form, such as a hot air convection oven, a radiant heat oven, a molten salt bath, or the like. If the element is to be subjected to the heat treatment amorphous locking process after formation, adhesion between the layers of PTFE sheets must be sufficient to allow the heat treatment amorphous locking process without delaminating the PTFE element. It should be appreciated that the same properties may be employed by subjecting the sheets of PTFE to a heated surface.

The sheets of PTFE may be filled with various fillers presently used to fill expanded microporous PTFE sheets as taught is U.S. Pat. No. 4,096,227 to Gore and U.S. Pat. No. 4,985,296 to Mortimer, Jr., incorporated herein by reference. Suitable particulate fillers may include, for example, inorganic materials such as metals, semi-metals, metal oxides, glass, ceramics, and the like. Alternatively, other suitable particulate fillers may include, for example, organic materials selected from activated carbon, carbon black, polymeric resin, and the like. Moreover, if conductive filler is used to fill the sheets of PTFE and is present in a sufficient amount, the sheets of PTFE may exhibit static dissipative or conductive properties, and PTFE elements produced from such sheets of PTFE may be static dissipative or conductive in nature as well.

The term "static dissipative" as used herein is intended to include any material with a volume resistivity of less than $10^9$ and greater than $10^2$ ohm cm as determined by ASTM D 257-90. The term "conductive" as used herein is intended to include any material having a volume resistivity of $10^2$ ohm cm or less as determined by ASTM D 257-90. "Particulate" is defined herein to mean individual particles of any aspect ratio including powders, fibers, etc.

In a further embodiment, coating at least a portion of the sheets of PTFE with an elastomer may impart increased resiliency to the PTFE element. Further, suitable polymeric materials for use as coatings on the sheets of PTFE may include, for example, ion exchange resins selected from the class consisting of perfluorosulfonic acid polymer and perfluorocarboxylic acid polymer. Such polymeric materials may provide improved properties such as resilience, electrochemical responsiveness, added strength, further reduced creep relaxation, etc. Once coated, the PTFE element is produced as described earlier.

Alternatively, one or more layers of the gasketing element may comprise materials other than a PTFE material to provide desired properties to the gasketing element. For example, one or more sheet-like elements, such as polymeric films, metal foils, metal screens, or the like, may be provided in or on the gasket element to provide enhanced properties to the resulting gasket element.

Figure 8A:
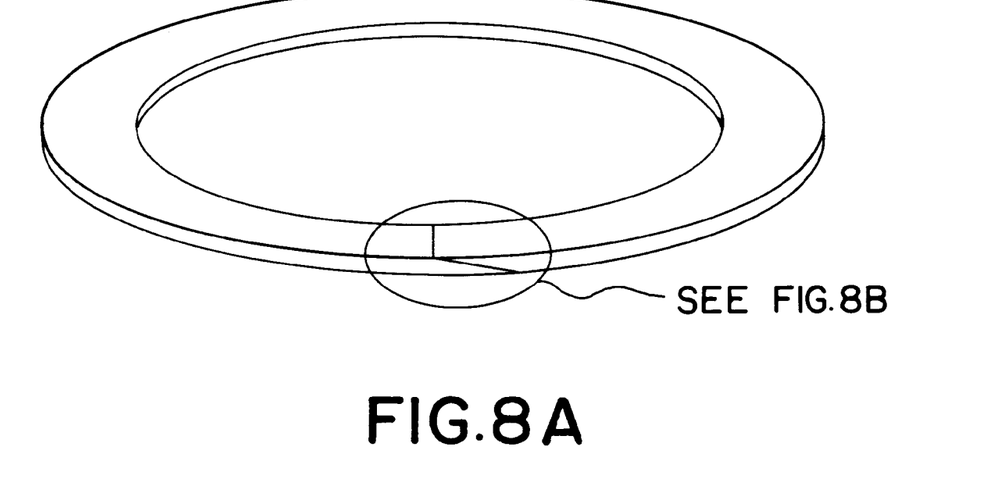
FIG. 8 is a three-quarter perspective view of the method by which the two ends of the inventive material are joined together to create an effective gasket.
Figure 8B:
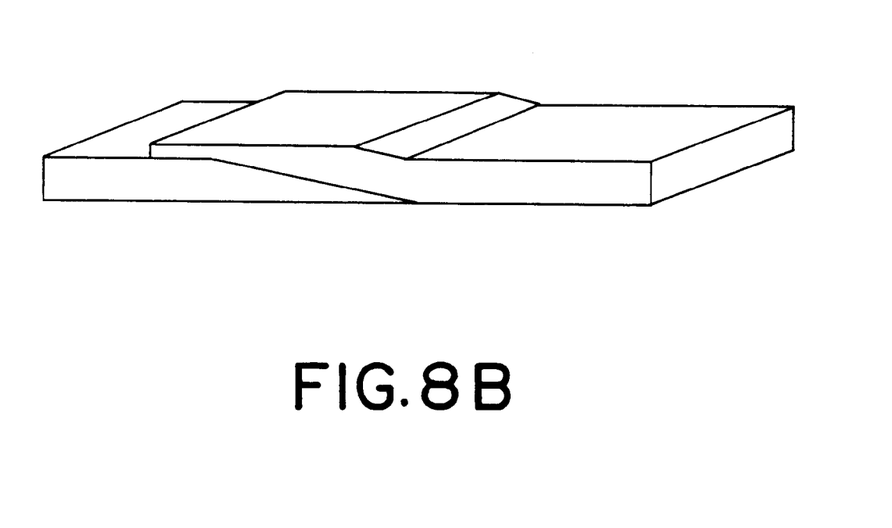

Referring to FIG. 8, the novel PTFE element 24 is shown as installed in a specific sealing application. As shown in FIG. 8, the two ends of the gasketing element 24 are skive cut in a diagonal fashion so as to join with each other in such a way that the sealing surface is covered entirely and there is no significant increase in gasket thickness due to the joining. Although this technique is preferred for certain embodiments, a seal between the ends of the gasket element may be formed by any technique, such as overlapping, or the like, which creates an effective seal. Preferably, this joining should occur at or near a bolt hole or other area of sufficient pressure to insure a complete seal.

In all embodiments of the present invention, the diameter and density of the PTFE element may be varied through the use of sheets of PTFE having differing porosities, thicknesses, and/or widths. The thickness and density of the PTFE element are also determined by the tightness with which the sheets of PTFE are assembled in the formation of the element. When the sheets of PTFE are expanded microporous PTFE sheets, the thickness and density of the PTFE element may be varied through the use of a heat treatment amorphous locking step. The heat treatment amorphous locking step may cause expanded microporous PTFE sheets to contract unless restrained by a physical means from doing so. Any appropriate means for restraint which is compatible with the gasket formation steps may be used. For example, a PTFE element of expanded microporous PTFE sheet may be induced to contract upon itself thereby tightening the expanded microporous PTFE sheets upon themselves and decreasing the diameter while increasing the density of the resultant element.

Without intending to limit the present invention to any specific theory, it is believed that the continuous form-in-place gasket material of the present invention achieves its improved resistance to creep relaxation by combining layers of PTFE expanded in both longitudinal and transverse directions. As is taught by U.S. Pat. No. 3,953,566, the expansion of PTFE significantly increases its strength in the direction of expansion. By layering PTFE materials oriented in both the longitudinal and transverse direction, increased strength and resistance to creep relaxation is imparted to the gasketing material.

Moreover, it is further believed that the unique configuration of the gasket elements of the present invention offers significant advantages over conventional gasketing elements. Specifically, the quadrilateral, layered configuration of these gaskets offers a continuous, form-in-place gasket element exhibiting high resistance to creep relaxation and dimensional change.

Applications for the present invention are numerous and not limited to the example presented. Applications such as automotive sealing surfaces, pump housings, reactor/separator sealing components, etc., are all possible applications for the inventive element.

Without intending to limit the scope of the present invention, the following examples illustrate how the present invention may be made and used:

EXAMPLE 1

A continuous PTFE sheet produced from fine powder PTFE resin through paste-forming techniques was obtained and expanded in directions 90 degrees opposed to each other (longitudinally and transversely) to form a sheet of expanded microporous PTFE film as taught in U.S. Pat. No. 4,187,390 to Gore.

The continuous sheet of ePTFE sheet, measuring approximately 1500 mm wide and 0.038 mm thick, spooled flat onto a cardboard core was placed onto a horizontal payoff machine. The ePTFE sheet was passed over a plastic idler drum and collected by a take-up machine bearing a stainless steel mandrel approximately 500 mm in diameter and 1350 mm long, having pins, approximately 13 mm long, around the outside edges of the mandrel circumference. As the ePTFE sheet was wrapped about the mandrel, tension was applied by hand across the width. The edges of the material were pulled by hand as the pins pierced and restrained the edges of the sheet. The tension applied to the pay-off was such that the pay-off would not turn freely and the ePTFE sheet did not droop between the pay-off and the take-up.

When approximately 85 wraps or layers of ePTFE were delivered to and restrained by the mandrel, the ePTFE sheet was cut across its width at the idler roll, thus separating the material deposited on the mandrel from the material remaining on the pay-off. The layers of ePTFE were further pressed over and down on the pins of the mandrel using wire brush hammers, and the loose or free end of the ePTFE sheet was smoothed out across its width.

The mandrel was removed from the take-up and submerged in a molten salt bath held at a temperature of approximately 370° C. for approximately 10 minutes. The mandrel was then removed from the molten salt bath, allowed to cool to room temperature (approximately 23° C.), and returned to the take-up.

Using a razor blade, a smooth, straight cut was made about the circumference of the gasket on one end of the mandrel, approximately 76 mm inside of the pins. All material located between the cut and the pins (nearest edge of the mandrel) and any material outside the pins of that edge was removed from the mandrel and discarded.

A distance equal to the desired gasket element width of 25 mm was then marked off on the material along the length of the mandrel. With a length of string, a helical line was generated about the layered ePTFE in order to create a smooth and continuous line from one side of the gasket material to the other. Two metal rods were tied to the ends of the string and carefully the string was pulled tight, slightly indenting the ePTFE. The string and tape were removed and a second cut was made along the indented line created by the string.

The spiral or helical cut was then continued using a razor blade, guided by the helical edge created, and offset from that edge a distance equal to the tape width desired (used earlier to begin the helical cut). In this case, the desired tape width, and therefore the offset distance, was 25 mm. By rotating the mandrel by hand the helical cut was continued until the razor came in contact with the pins at the other end of the mandrel.

The gasket element cut from the mandrel, measuring approximately 60 m long, 25 mm wide and 3.2 mm thick, was collected in a container. An adhesive strip was placed onto one side of the gasket element, and it was spooled onto a flanged core.

EXAMPLE 2

A continuous PTFE sheet produced from fine powder PTFE resin through paste-forming techniques was obtained and expanded in directions 90 degrees opposed to each other (longitudinally and transversely) to form a sheet of expanded microporous PTFE film as taught in U.S. Pat. No. 4,187,390 to Gore.

The continuous ePTFE sheet, measuring approximately 1500 mm wide and 0.038 mm thick, spooled flat onto a cardboard core was placed onto a horizontal payoff machine. The ePTFE sheet was passed over a plastic idler drum and collected by a take-up machine bearing a stainless steel mandrel approximately 1.0 m in diameter and 1.5 m long, having pins, approximately 13 mm long, around the outside edges of the mandrel circumference. As the ePTFE sheet was wrapped about the mandrel, tension was applied by hand across the width. The edges of the material were pulled by hand as the pins pierced and restrained the edges of the sheet. The tension applied to the pay-off was such that the pay-off would not turn freely and the ePTFE sheet did not droop between the pay-off and the take-up.

When approximately 85 wraps or layers of ePTFE were delivered to and restrained by the mandrel, the ePTFE sheet was cut across its width at the idler roll, thus separating the material deposited on the mandrel from the material remaining on the pay-off. The layers of ePTFE were further pressed over and down on the pins of the mandrel using wire brush hammers, and the loose or free end of the ePTFE sheet was smoothed out across its width.

The mandrel was removed from the take-up and placed into an air oven at a temperature of about 365° C. for about 1 hour, then the mandrel was allowed to cool.

Using a razor blade, a smooth, straight cut was made about the circumference of the gasket on one end of the mandrel, approximately 76 mm inside of the pins. All material located between the cut and the pins (nearest edge of the mandrel) and any material outside the pins of that edge was removed from the mandrel and discarded.

A distance equal to the desired gasket element width of 25 mm was then marked off on the material along the length of the mandrel. With a length of string, a helical line was generated about the layered ePTFE in order to create a smooth and continuous line from one side of the gasket material to the other. Two metal rods were tied to the ends of the string and the string was pulled tight, slightly indenting the ePTFE. The string was removed and a second cut was made along the indented line created by the string.

The spiral or helical cut was then continued using a razor blade, guided by the helical edge created, and offset from that edge a distance equal to the tape width desired (used earlier to begin the helical cut). In this case, the desired tape width, and therefore the offset distance, was 25 mm. By rotating the mandrel by hand the helical cut was continued until the razor came in contact with the pins at the other end of the mandrel.

The gasket element cut from the mandrel, measuring approximately 60 m long, 25 mm wide and 3.2 mm thick, was collected in a container. An adhesive strip was placed onto one side of the gasket element, and it was spooled onto a flanged core.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A form-in-place gasket element having both longitudinal and transverse axes, consisting essentially of layered parallel sheets of biaxially expanded PTFE film, said gasket having a quadrilateral cross-section, the layered sheets having orientation to impart strength along at least the gasket's transverse axis;

whereby the gasket element under compression is resistant to creep relaxation along its transverse axis.

2. The form-in-place gasket element of claim 1, wherein said layered sheets further have orientation to impart strength along the gasket's longitudinal axis, whereby the gasket under compression is resistant to creep relaxation along its longitudinal axis.

3. The form-in-place gasket element of claim 1, wherein said expanded PTFE film further comprises at least one filler.

4. The form-in-place gasket element of claim 3, wherein said at least one filler comprises at least one material selected from the group consisting of metals, semi-metals, metal oxides, glasses, ceramics, activated carbons, carbon blacks, and polymeric resins.

5. The form-in-place gasket element of claim 3, wherein said at least one filler comprises at least one conductive filler.

6. The form-in-place gasket of claim 1, further comprising an adhesive on the gasket.

7. A method of using a form-in-place gasket element consisting essentially of layered parallel sheets of biaxially expanded PTFE film, comprising:

placing the form-in-place gasket between sealing components; and sealing the gasket between said sealing components, wherein said gasket element under compression is resistant to creep relaxation along both its longitudinal and transverse axes.

* * * * *